US005157510A

United States Patent [19]

Quan et al.

[11] Patent Number: 5,157,510
[45] Date of Patent: Oct. 20, 1992

[54] METHOD AND APPARATUS FOR DISABLING ANTI-COPY PROTECTION SYSTEM IN VIDEO SIGNALS USING PULSE NARROWING

[75] Inventors: Ronald Quan, Cupertino; John F. Peruzzi, Redwood City, both of Calif.

[73] Assignee: Macrovision Corporation, Mountain View, Calif.

[21] Appl. No.: 631,858

[22] Filed: Dec. 20, 1990

[51] Int. Cl.[5] .............................................. H04N 5/76
[52] U.S. Cl. ..................................... 358/335; 358/310; 380/3
[58] Field of Search ............... 358/319, 148, 335, 310; 360/33.1, 37.1, 60, 27, 15; 380/5, 10, 15, 7, 3, 11

[56] References Cited

U.S. PATENT DOCUMENTS 4,626,890 12/1986 Ryan ........................................ 358/19
4,951,315 8/1990 Switsen .................................. 380/15

Primary Examiner—Dale M. Shaw
Assistant Examiner—Robert Chevalier
Attorney, Agent, or Firm—Skjerven, Morrill, MacPherson, Franklin & Friel

[57] ABSTRACT

A method and apparatus for disabling the effect of copy-protect signals added to a video signal using differences in the characteristics of television and VCR circuitry. Copy-protect signals as described include pseudo-sync pulses and/or added AGC pulses in the vertical blanking intervals of a video signal. The specific method described includes increasing the effective frequency of the copy-protect signals during the vertical blanking intervals so as to achieve attenuation and/or low-pass filtering in the VCR circuitry to thereby render the signals ineffective in preventing copying. A circuit for achieving this method comprises pulse narrowing and/or pulse multiplication circuitry which effectively increases the high-frequency content of the pseudo-sync and/or AGC pulses.

19 Claims, 8 Drawing Sheets

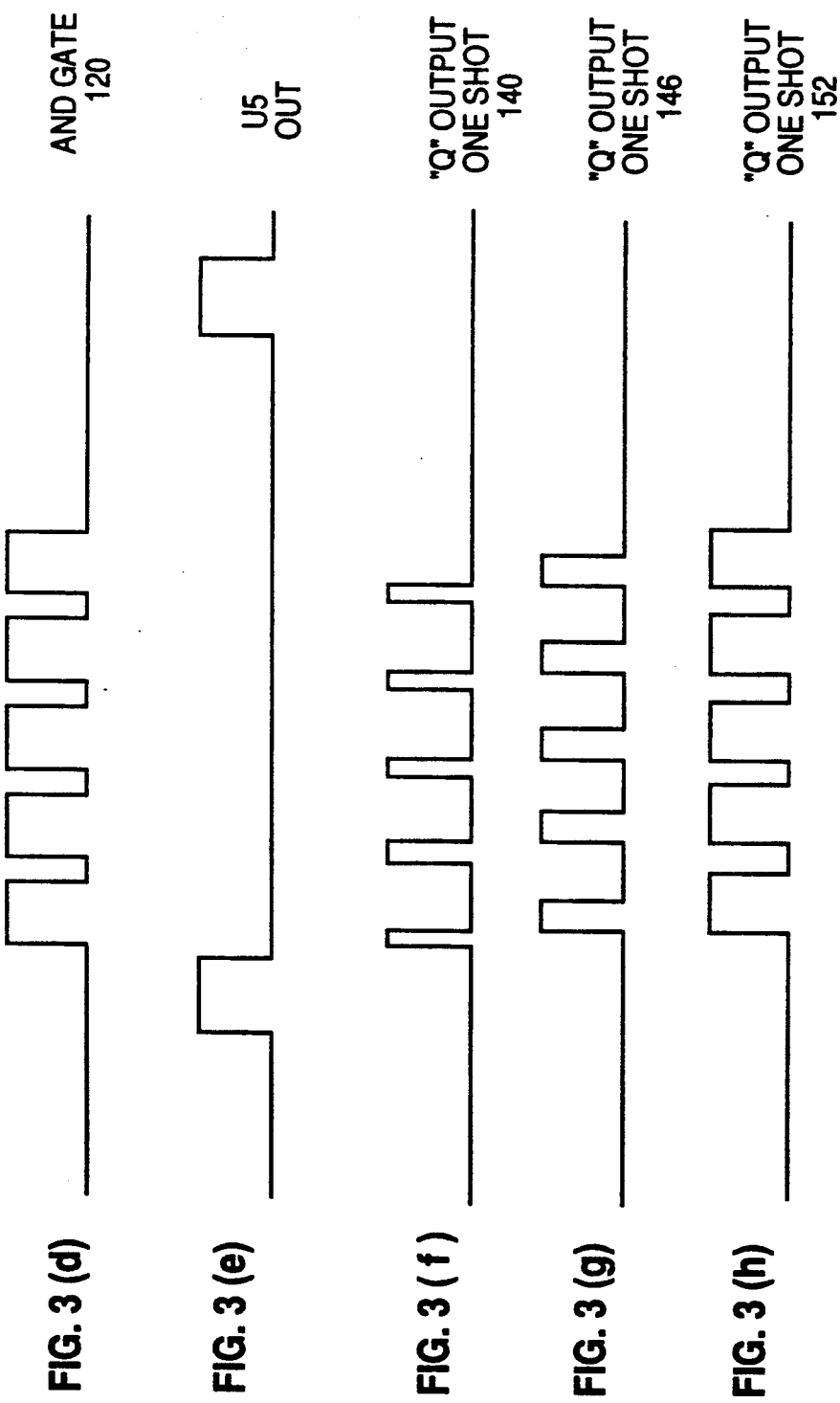

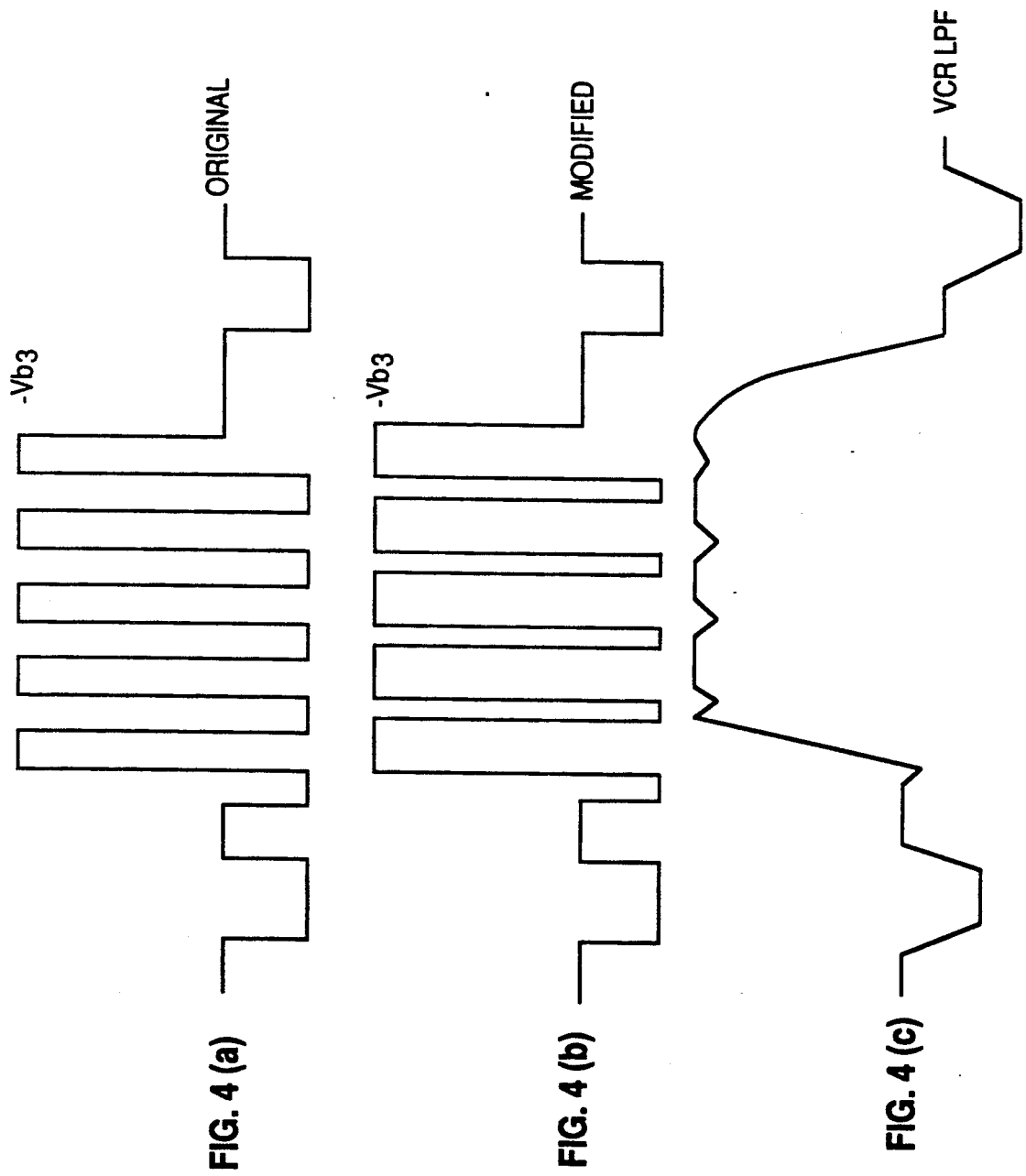

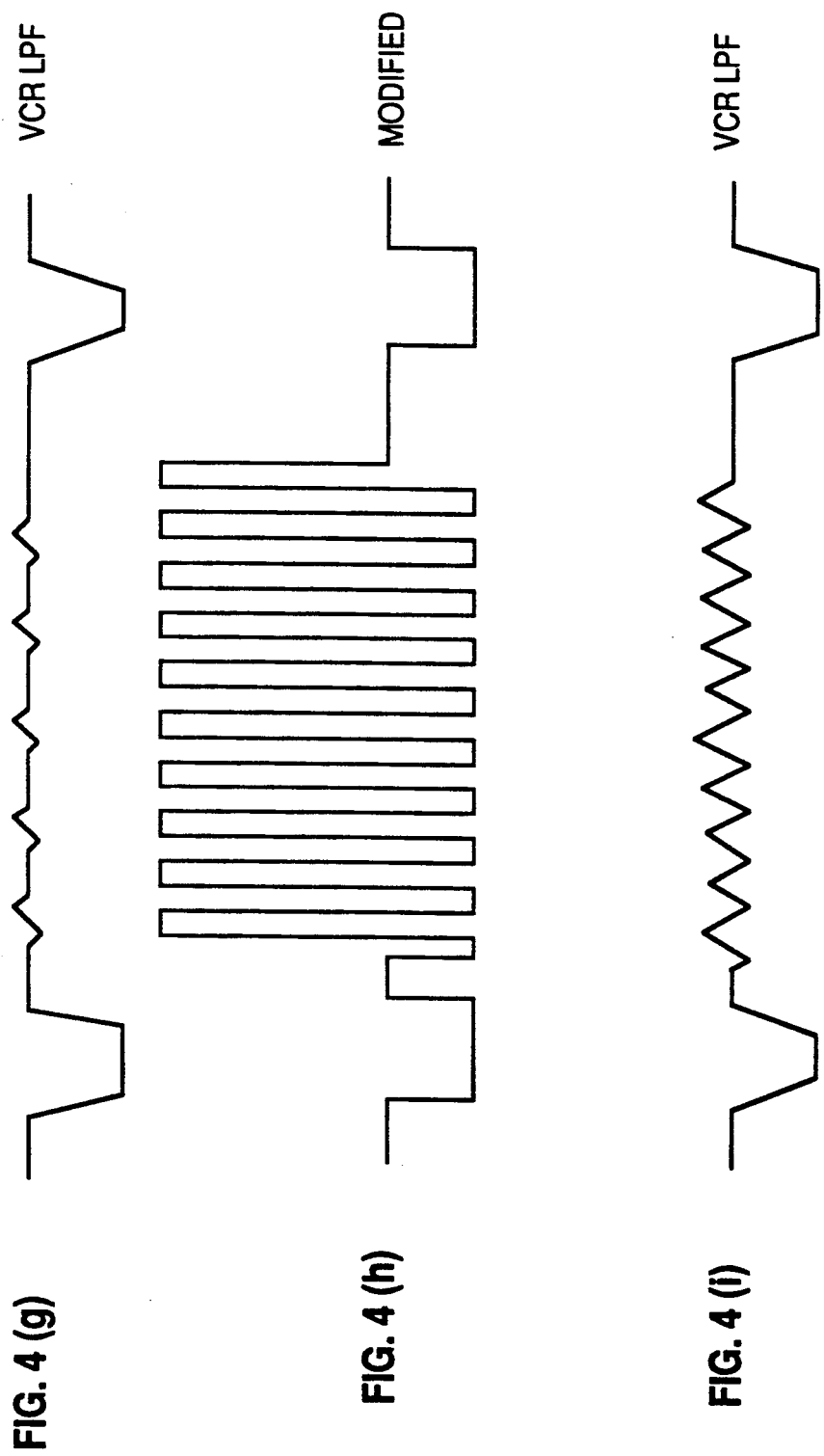

METHOD AND APPARATUS FOR DISABLING ANTI-COPY PROTECTION SYSTEM IN VIDEO SIGNALS USING PULSE NARROWING

CROSS REFERENCE TO RELATED APPLICATIONS AND PATENTS

This invention is related to commonly owned U.S. Pat. No. 4,631,603 entitled "METHOD AND APPARATUS FOR PROCESSING VIDEO SIGNALS SO AS TO PROHIBIT THE MAKING OF ACCEPTABLE VIDEO TAPE RECORDINGS THEREOF" which issued on Dec. 23, 1986; U.S. Pat. No. 4,695,901 entitled "METHOD AND APPARATUS FOR REMOVING PSEUDO-SYNC AND/OR AGC PULSES FROM A VIDEO SIGNAL" which issued on Sep. 22, 1987; and copending patent application U.S. Ser. No. 06/935,055 filed Nov. 21, 1989, for "METHOD AND APPARATUS FOR PROCESSING A VIDEO SIGNAL SO AS TO PROHIBIT THE MAKING OF ACCEPTABLE VIDEO TAPE RECORDINGS" which is a continuation of patent application U.S. Ser. No. 06/554,695 filed Nov. 23, 1983, now abandoned and to copending patent application U.S. Ser. No. 07/614,185, filed Oct. 13, 1990, for "Method and Apparatus for Disabling Anti-Copy Protection System in Video Signals."

BACKGROUND OF THE INVENTION

This invention pertains to video signal encoding/decoding systems, but more specifically, to a method and apparatus for restoring to proper video format, a video signal which has previously been encoded with anti-copy protection signals. The invention finds its widest use in restoring video signals which are prerecorded on a video recording medium, such as signals recorded on a videotape of a video cassette.

By its U.S. Pat. No. 4,631,603 and by its copending patent application U.S. Ser. No. 935,055, the assignee hereof disclosed anti-copy protection systems for use with video signals. The system disclosed in the '603 patent is finding significant usage with video signals on recorded video cassette tapes. The addition of the copy-protect signal(s) to a prerecorded video cassette tape can interfere with unauthorized copying of the tape but still permit viewing of the program from the original tape. The anti-copy protection systems in widest use at the time this patent application is filed include the addition to the normal video signal, of unique ordered pairs of pseudo-synchronizing pulses and positive pulses placed at certain locations in the video signal so as to have the effect of inhibiting proper AGC (automatic gain control) adjustment in a video tape recorder (VCR) during recording. As a result, the picture quality obtained from a copy of the video signal having the copy-protect signals is significantly deteriorated. However, these unique copy-protect signals do not affect normal viewing of the video material using a conventional television set.

To explain the copy-protect processes, a typical video signal defines normal viewing fields (e.g., those parts defining the display for a television set or monitor), horizontal blanking intervals, and vertical blanking intervals between normal viewing fields. Both the viewing fields and the vertical blanking intervals comprise a series of horizontal scan lines carrying picture data and control information that include for each line in an associated horizontal blanking interval, a horizontal synchronizing (or sync) pulse. The horizontal sync pulses are used for horizontally registering successive scan lines. Other synchronizing pulses, e.g., broad pulses and equalizing pulses, normally occur during the vertical blanking interval. These pulses generally are called vertical synchronizing ("sync") pulses because they occur only during the vertical blanking interval. A television monitor or set, and also the processing circuitry associated with VCR copying, use the vertical sync pulses for vertical synchronization.

It should be noted that there are portions of a normal viewing field defined by a video signal that typically are not used for the actual display. More specifically, the horizontal scan lines immediately adjacent to those portions of a video signal defining vertical blanking intervals, are not displayed by typical television monitors or sets. Because of this, those signal portions immediately adjacent to vertical blanking intervals are also available in their entirety for the addition of copy-protect signals. Thus, insofar as this invention is concerned, such signal portions may also be considered part of the vertical blanking intervals, and the term "vertical blanking interval" as used herein is meant to encompass the same unless it is clear from the usage that only the actual vertical blanking interval is meant.

The aforementioned copy-protection systems of assignee alter a normal video signal by adding positive (AGC) and/or pseudo-sync pulses after at least some of the native sync pulses. By "added" pulses are meant pulses which are formed in the video signal to prevent copying, i.e., signals which supplement the normal video signal carrying typical picture data and control information. That is, the term "added" as used herein refers to the type of signal, rather than to the time at which it may be incorporated with the remainder of the video signal. In the arrangement disclosed in U.S. Pat. No. 4,631,603, the added pulses appear in the vertical blanking interval and interfere with a VCR's recording AGC circuitry.

Under certain circumstances, there is a need to disable the anti-copy protection system to permit recording of copy-protected recordings, such as, for example, during authorized and permitted copying or for studio editing purposes. Assignee's U.S. Pat. No. 4,695,901 discloses several embodiments of one such system. It is an objective of the present invention to provide an improvement for disabling an anti-copy protect system.

SUMMARY OF THE INVENTION

In accordance with the foregoing objectives, the invention comprises a method and apparatus for narrowing the width of pulses occurring during at least a portion of those parts of a video signal containing copy-protect signals, such as pseudo-sync or AGC pulses occurring during the vertical blanking intervals of a video signal, by an amount which enables acceptable viewing of a video signal containing such parts. In other words, the frequency content of the added or imbedded copy-protect signals is increased.

Pulse narrowing is preferably attained by detecting at least the copy-protect signals, generating timing pulses based upon the detection to define a period within which pulses are to be narrowed, and altering the video signal by narrowing pulses in accordance with the defined period. Narrowing is preferably achieved by truncating a portion of the pulses or spacing them closer together to attain a high-frequency effect. The method and apparatus takes advantage of limited bandwidth capacity of VCR circuits, which behave similar to a low-pass filter.

The invention comprehends detecting the copy-protect signals indirectly. For example, if the copy-protection signals are in the vertical blanking interval, then the detection can be of the vertical blanking interval rather than of the copy-protect signals themselves.

These and other aspects, features and advantages of the invention will become apparent upon review of the succeeding description taken in connection with the accompanying drawings. The invention, though, is pointed out with particularity by the appended claims.

BRIEF DESCRIPTION OF THE DRAWINGS

With reference to the accompanying six sheets of drawings.

DESCRIPTION OF ILLUSTRATIVE EMBODIMENTS

Copy-protection of video signals is finding its widest use now in the protection of prerecorded tapes. It therefore will be described in connection with the use of the system of U.S. Pat. No. 4,631,603 for protecting prerecorded tapes of video cassettes. The circuit diagrams of FIGS. 1 to 2 together with the waveforms of FIGS. 3 to 4 illustrate alternative embodiments of the invention which inhibit or disable the effect of the copy-protect signals. The illustrated anti-copy removal circuit operates on copy-protect signals placed in the vertical blanking interval. In the described embodiments to follow, disabling or reduction of the effect of the copy-protect signals is achieved by narrowing the width of the pseudo-sync and/or AGC pulses, or by otherwise increasing their frequency content by means such as, for example, time-compressing the pulses or adding additional narrow pulses between them. Such means can be employed during all or part of the copy-protect signals. In fact, these embodiments are illustrative of any such means which alters, modifies or changes the video signal in a fashion where, because of the relatively slow response time or other characteristic of a VCR, the copy-protect signals become less effective or nullified to prevent unauthorized copying. (For example, narrowing the pseudo-sync pulses will not allow the VCR's sync separator circuit to separate out the pseudo-sync. Also, narrowing the AGC pulses will not allow the AGC sampling circuits to respond.)

FIG. 3(a) depicts typical prerecorded signals in a vertical blanking interval. The vertical blanking interval includes a normal negative-going sync pulse 12, a normal positive-going AGC pulse 14, a series of added pseudo-sync pulses 16, and a series of added AGC pulses 18. It should be noted that pulse 14 can be thought of simply as a return to the normal video blanking or black voltage level. In this connection, the direction of positive and negative-going pulses is relative to a reference voltage. This voltage typically is the normal blanking or black level of a video signal.

FIG. 3(b) illustrates the results of a first modification wherein the pseudo-sync pulses 16' are narrowed to an extent where the VCR cannot respond to them. FIG. 3(i) illustrates the results of a second modification wherein AGC pulses 18' are narrowed. FIG. 3(j) illustrates the results of yet a third modification wherein both pseudo-sync pulses 16' and AGC pulses 18' are narrowed. Other variations or modifications, such as other types of pulse narrowing and pulse extension, signal substitution or removal, or any combination thereof may also be employed to achieve the intended result of enabling copying of video signals having the copy-protect signals to increase the effective frequency content of such copy-protect signals.

Figure 1:
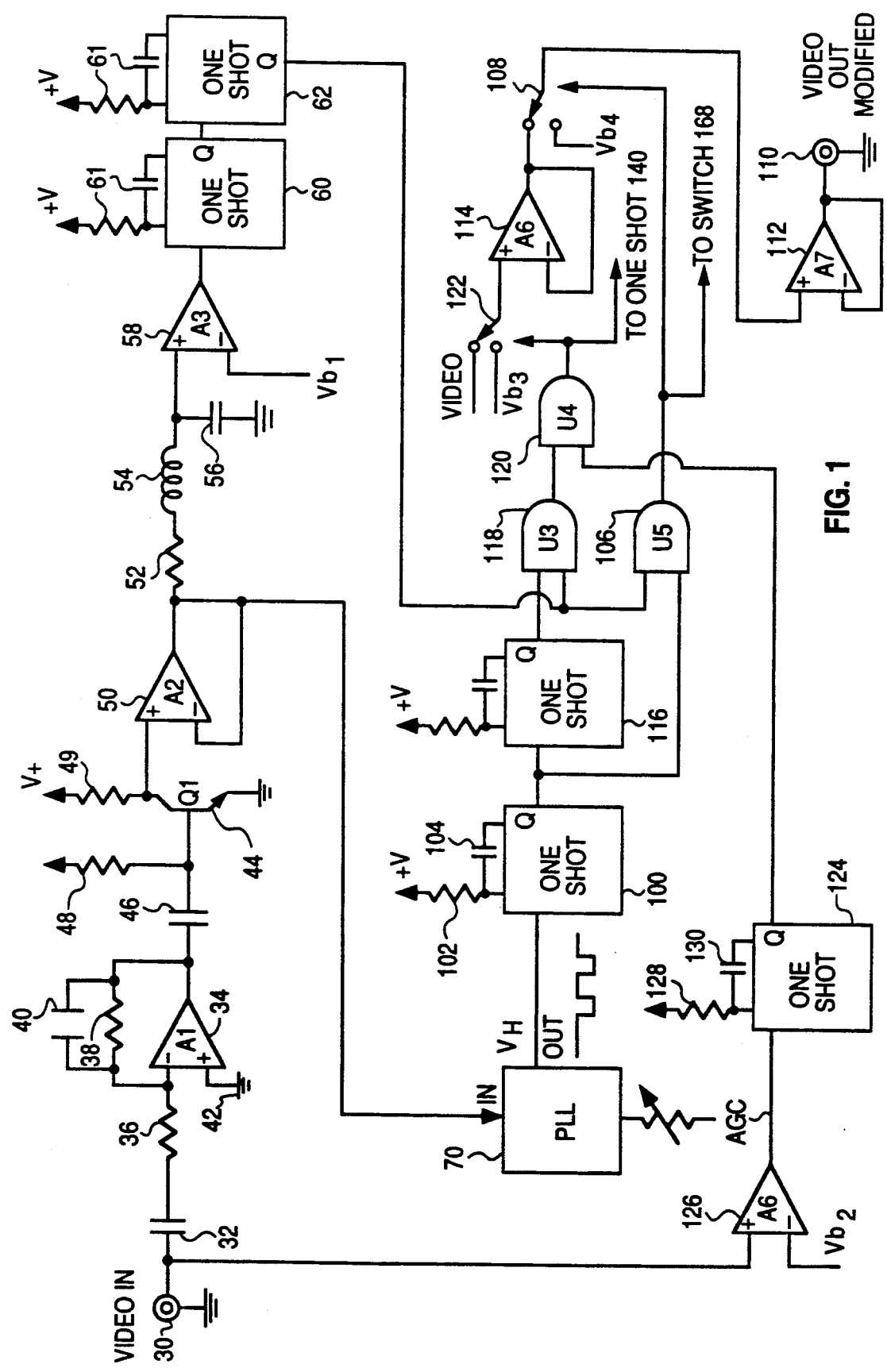
FIG. 1 is a detailed diagram of an illustrative circuit which alters the frequency characteristics of normal copy-protect signals by narrowing widths of pseudo-sync pulses.
Figure 2:
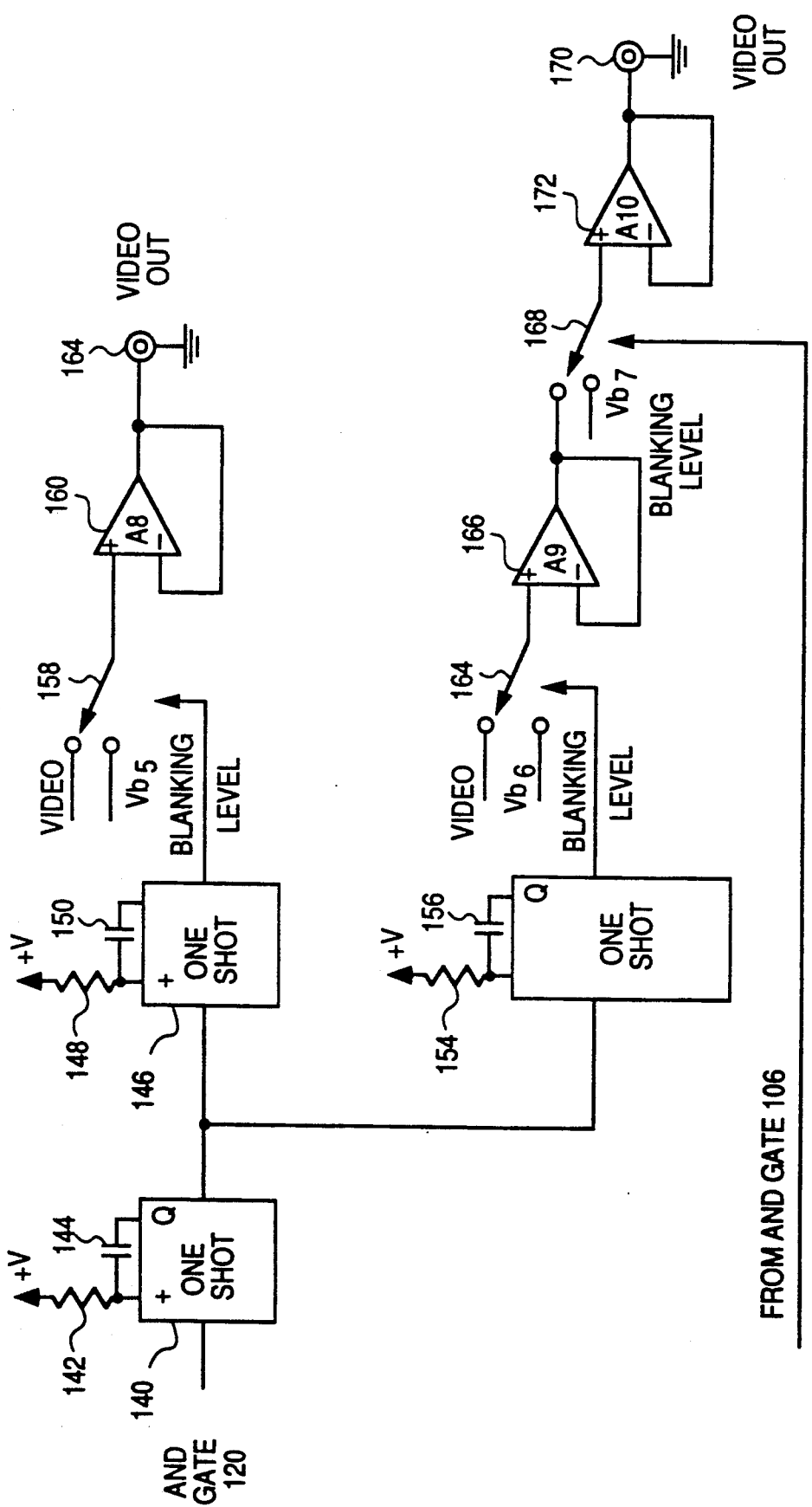
FIG. 2 is a detailed diagram of an illustrative circuit which, in conjunction with the circuit of FIG. 1, narrows either the AGC pulses or both AGC and pseudo-sync pulses.
Figure 3:
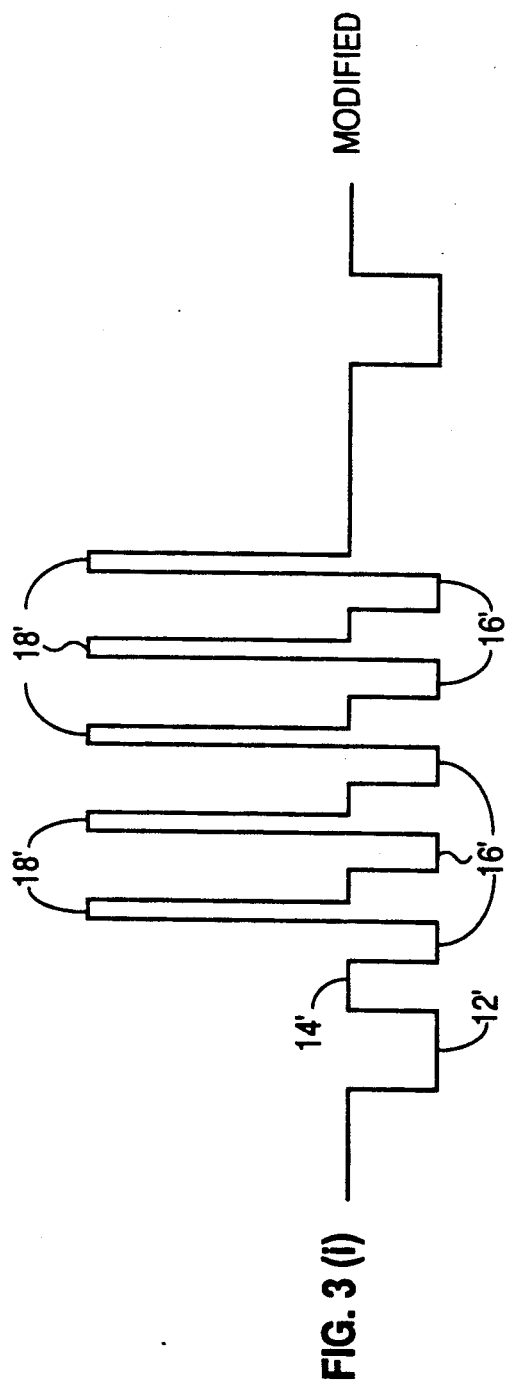
FIGS. 3(a) through 3(j) are waveforms useful for explaining the operation of the circuits of FIGS. 1 and 2.
Figure 3:
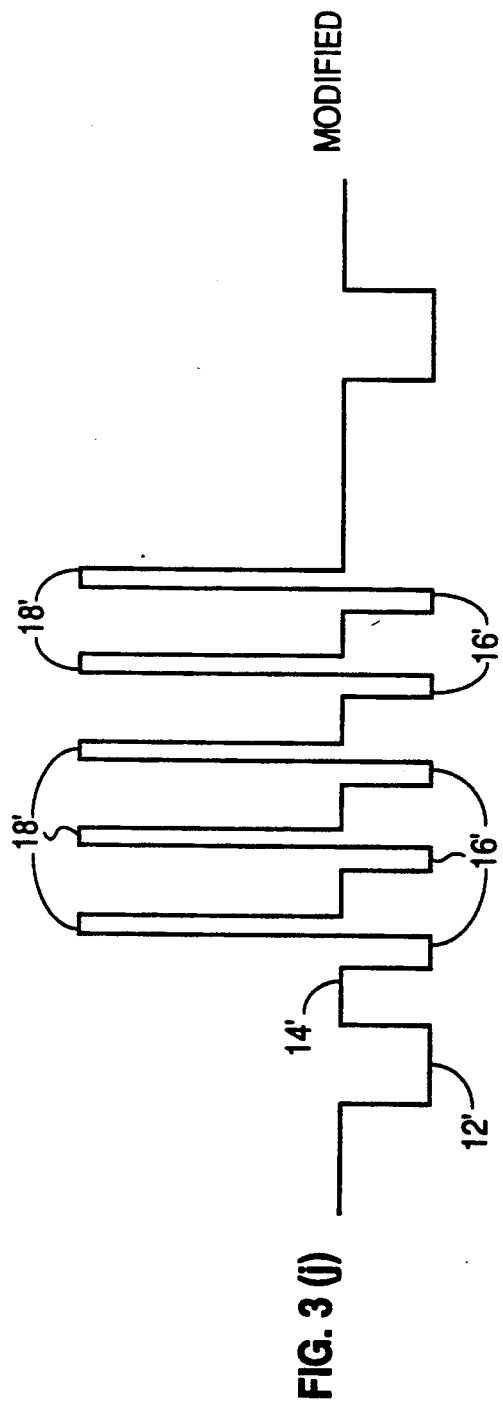
Figure 4:
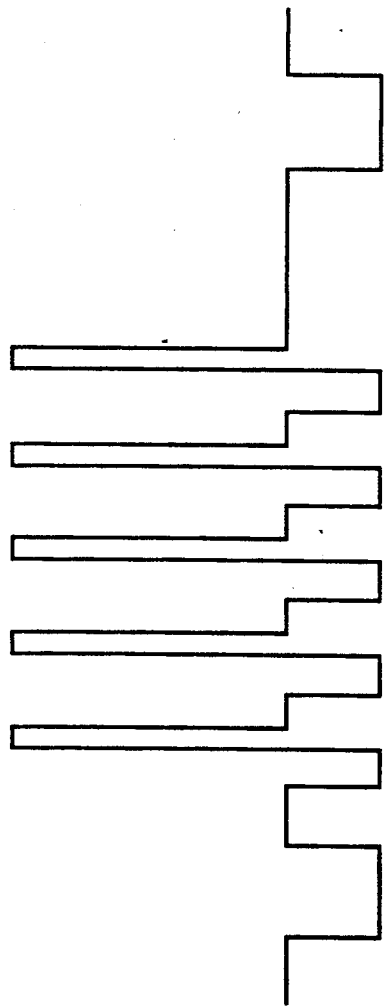
FIGS. 4(a) through 4(i) are waveforms useful for describing the effect of altered video signals in VCR circuitry.
Figure 4:
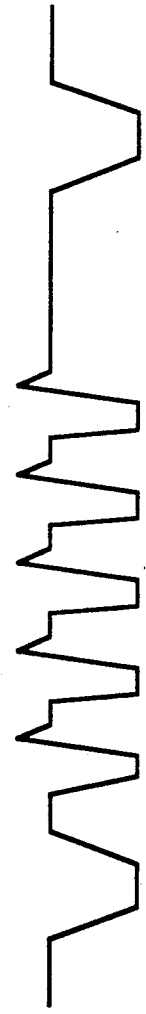
Figure 4:
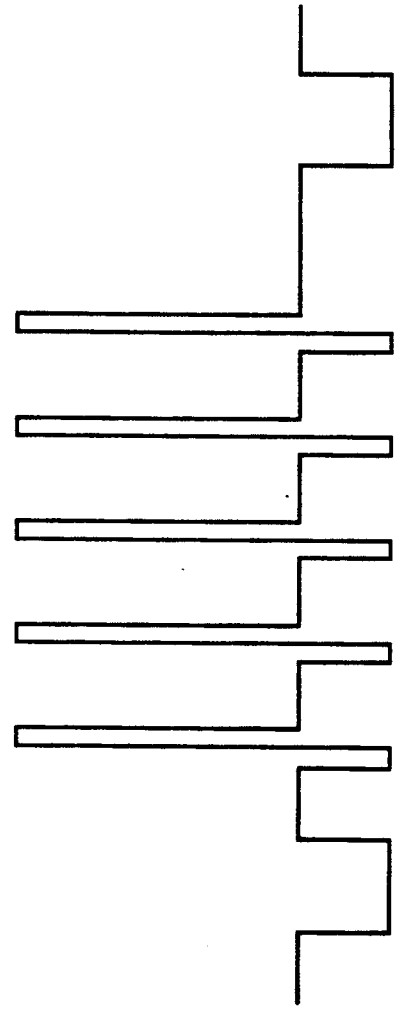
Figure 3:
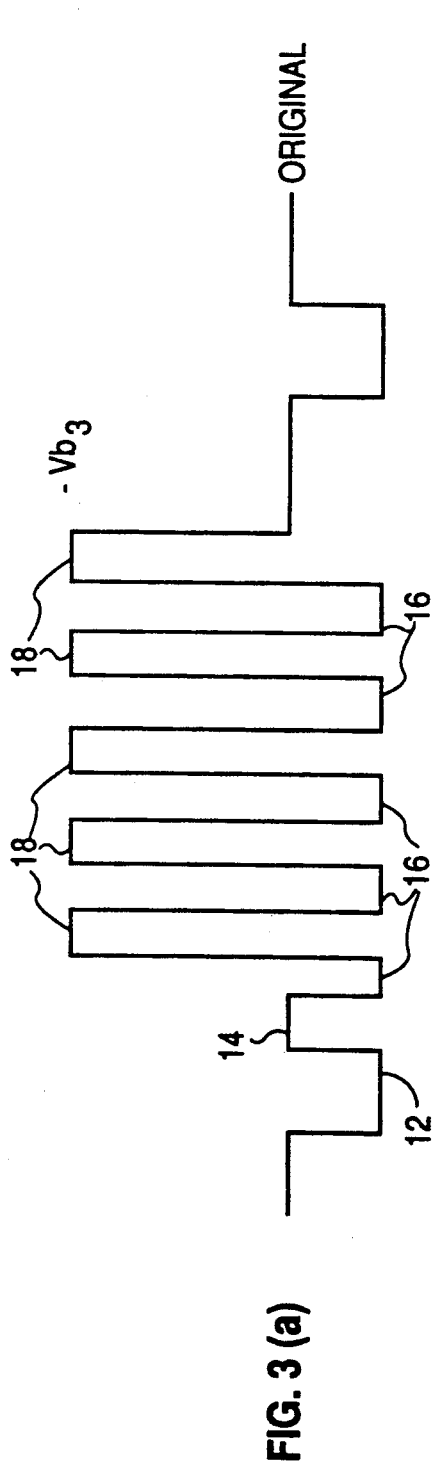
Figure 3:
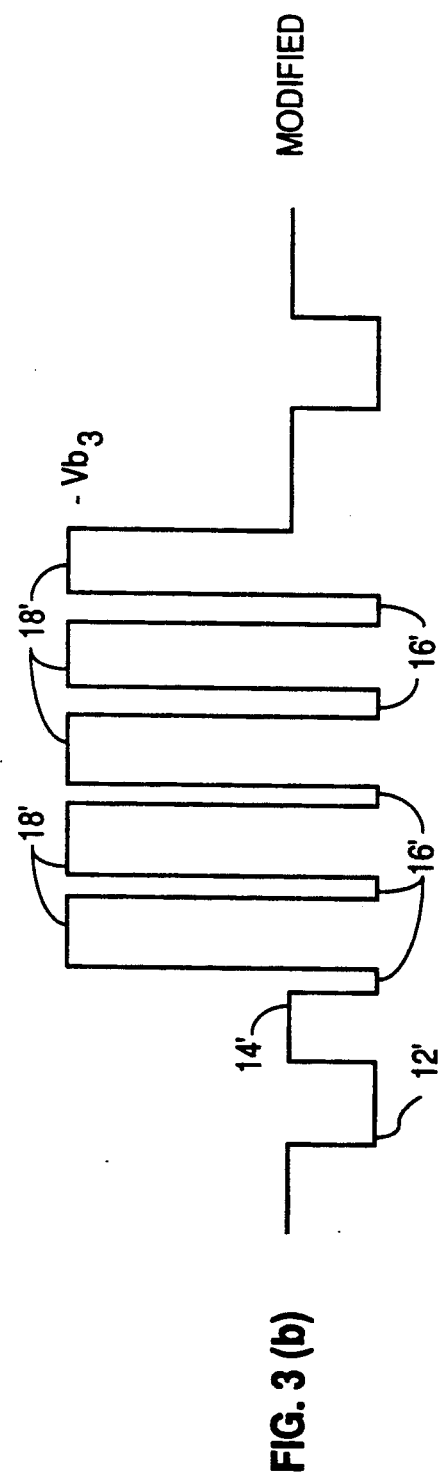
Figure 3:
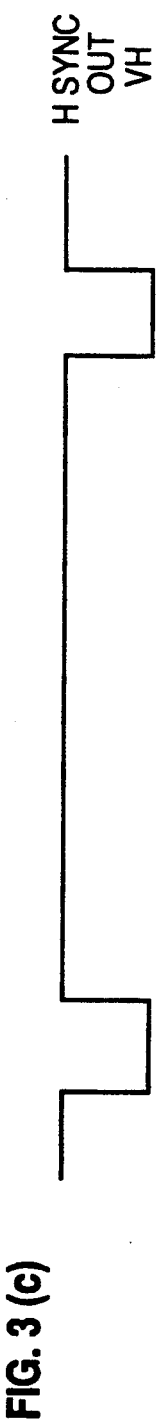

With the aid of other waveforms shown in FIG. 3, the pulse narrowing circuits of FIGS. 1 and 2 are described as illustrative of a circuit means of the invention. FIG. 1 illustrates a circuit for narrowing pseudo-sync pulses, while FIG. 2 illustrates a circuit for narrowing AGC pulses or both AGC and pseudo-sync pulses. The copy-protect disabling means may include either or both of these circuits.

With reference to the pseudo-sync pulses narrowing circuit of FIG. 1, video input jack 30 receives prerecorded video input signals from a medium containing the copy-protect signals and couples the video input signals to the negative input terminal of an inverting amplifier 34 via a capacitor 32 and resistor 36. The positive (non-inverting) input terminal of the amplifier is coupled to a ground reference 42. Resistors 36 and 38 establish the gain of amplifier 34 while capacitor 40 absorbs high-frequency noise in the feedback path of the amplifier 34. Amplifier 34 transfers inverted video pulses to the base of an emitter-grounded transistor 44.

Transistor 44 constitutes a sync separator circuit which senses the vertical sync pulses upon playback of prerecorded video signals. No AGC pulses are passed. As shown, the emitter of transistor 44 is coupled to ground so that, upon turn-on of transistor 44, its collector voltage drops to ground. Resistor 48 establishes a base input bias for turning on sync-separator transistor 44, and resistor 49 sets bias at the collector output of transistor 44. Inverted video from amplifier 34 is fed to the base of transistor 44 via capacitor 46 to generate a composite sync output at the collector of transistor 44. The composite sync output includes both the normal and pseudo-sync pulses which are supplied to the non-inverting input terminal of a buffer amplifier 50.

Buffer 50 transfers the composite sync output both to a low-pass filter constituted by resistor 52, inductor 54 and capacitor 56; and to a horizontal rate, phase-locked loop (PLL) circuit 70 which is subsequently described. After passage through the low-pass filter, the composite signal becomes a first vertical rate pulse indicative of the vertical blanking intervals of the prerecorded video signal. This first vertical rate pulse is conditioned further by comparator amplifier 58 which has a reference voltage $V_{b1}$ connected to its inverting input terminal and the vertical rate pulse connected to its non-inverting input terminal. Comparator 58 outputs a second vertical rate pulse of a predetermined voltage level $V_{b1}$ to a one-shot circuit 60 which delays the same. A second one-shot circuit 62 responds to the trailing edge of a pulse from one-shot circuit 60 to produce yet another pulse $V_v$. Resistors and capacitors 61 establish the time durations of the output pulses of the respective one-shots 60 and 62. Time constants and delays produced by the one-shot circuits 60 and 62 produce a pulse $V_v$ that extends from about lines ten through twenty of the horizontal scan, i.e., represents the vertical blanking interval.

As mentioned earlier, buffer 50 also supplies the composite video sync pulses to a conventional horizontal rate, phase-locked loop (PLL) circuit 70. The circuit 70 produces horizontal sync pulses $V_H$ at a rate of 15.734 kHz in synchronism with horizontal rate pulses of incoming video from the buffer 50. A phase/frequency detector of PLL circuit 70 responds to phase differences between the input and output signals to maintain synchronism. PLL circuit 70 ignores equalizing and pseudo-sync pulses in maintaining phase lock.

Each horizontal sync pulse $V_H$ is supplied to a one-shot circuit 100. One-shot 100 extends the duration of each of such horizontal sync pulses. Resistor 102 and capacitor 104 establish the duration of each output pulse of one-shot circuit 100. Both the extended horizontal sync pulse from one-shot 100 and the vertical rate sync pulse $V_v$ are supplied to the inputs of AND gate 106, the output of which, shown in FIG. 3(e), controls an analog switch 108. When AND gate 106 is asserted, switch 108 couples video output 110 via buffer 112 to a blanking reference voltage $V_{b4}$ for a time duration so as to narrow the first pseudo-sync pulses as indicated in FIG. 3(b). When AND gate 106 is deasserted, switch 108 couples the video output via buffer 112 to the signal emanating from buffer 114.

With respect to the output of buffer 114, one-shot circuit 100 also supplies an output to another one-shot circuit 116 thereby to produce at the latter's output terminal, a signal indicative of the horizontal line period, e.g., a horizontal active line gate. AND gate 118 produces an active horizontal video gate signal for scan lines 10 through 20 by logically combining the output of one-shot circuit 116 and the vertical rate signal $V_v$.

AND gate 120 produces a signal for controlling a switch 122 that functions in combination with switch 108 to alter the video output signal at output terminal 110. One input terminal of AND gate 120 is the output terminal of AND gate 118 and the other input terminal is coupled to the output terminal of yet another one-shot circuit 124. One-shot 124 emits a series of pulses triggered by incoming AGC pulses. Also, one-shot 124 triggers on the rising edge of the incoming AGC pulses and produces at its output terminal time-extended AGC pulses. These extended pulses are produced by "slicing" the incoming video signal at a certain voltage level to pass only those pulses above a threshold established by a reference voltage $V_{b2}$. The reference voltage $V_{b2}$ is coupled to the inverting input of differential amplifier 126. Time constant components including resistor 128 and capacitor 130 of one-shot circuit 124 enable amplifier 126 to produce the extended AGC pulses having a duration longer than the original AGC pulses. As a result, the output signal of AND gate 120 contains all sliced video pulses during lines 10 through 20 in the vertical blanking interval.

When AND gate 120 is asserted, an AGC reference pulse of a level $V_{b3}$ is inserted in the video signal at output terminal 110, as depicted in FIG. 3(b). When AND gate 120 is deasserted, the video signal passes unchanged to the output terminal 110. In the VCR, the video signal during a portion of the vertical interval becomes "filtered" as depicted in FIG. 4(c).

FIG. 2 illustrates a circuit for narrowing AGC pulses and/or pseudo-sync pulses. For AGC pulse narrowing, the illustrated circuit receives a control signal (FIG. 3(d)) from AND gate 120 (FIG. 1) and generates pulses having a fraction of the width of the original AGC pulses. As previously explained, the control signal triggers on the leading edge of each original AGC pulse. Time-constant components including resistor 142 and capacitor 144 establish the pulse width of one-shot 140 output pulses, as shown in FIG. 3(f). These pulses trigger additional one-shots 146 and 152. As subsequently described in further detail, one-shot 146 produces control pulses which narrow AGC pulses, while one-shot 152 produces control pulses which narrow both AGC and pseudo-sync pulses.

To narrow AGC pulses, the output signal of one-shot 146 controls switch 158 to couple either the input video signal or a blanking reference level $V_{b5}$ to buffer amplifier 160. The widths of pulse emitted from one-shot 146 are established by resistor 148 and capacitor 150. Exemplary pulses are shown in FIG. 3(g). The buffer amplifier 160 supplies an output video signal from switch 158 to an output terminal 162, as shown in FIG. 3(i), which enables copying of input video having embedded copy-protect signals.

To narrow both AGC and pseudo-sync pulses, one-shot 152 produces a control signal which controls switch 164. FIG. 3(h) depicts the output of one-shot 152 in accordance with resistor-capacitor time-delay circuit 154, 156. Switch 164, under control of one-shot 152, couples either input video or a blanking reference level $V_{b6}$ to buffer amplifier 166. Buffer amplifier 166 holds the output from switch 164 for further alteration. Another control signal (FIG. 3(e)) from AND gate 106 (FIG. 1) controls a switch 168 to effect cascaded control of the video signal from switch 164. As a result, the combined effect on the video signal at output 170 via buffer amplifier 172 is a video signal having both AGC pulses and pseudo-sync pulses narrowed, as shown in FIG. 3(j).

As readily understood from the foregoing, a preferred means for disabling the effect of copy-protect signal appearing in a prerecorded medium may comprise any one of, or a combination of, the subparts previously set forth, depending upon whether it is desired to change either or both of the AGC and pseudo-sync pulses.

FIG. 4 illustrates the relationship among original copy-protect input signals of FIG. 4(a), various selected disabling means, the typical VCR circuitry. For example, upon narrowing pseudo-sync pulses as shown by FIG. 4(b), the low-pass filtering effect of the VCR transfers a waveform illustrated in FIG. 4(c) wherein only the original sync pulse is seen, and added AGC pulses and pseudo-sync pulses have disappeared. Upon narrowing AGC pulses as indicated in FIG. 4(d), the low-pass filtering effect of the VCR transfer a waveform as illustrated in FIG. 4(e) wherein the positive AGC pulses no longer affect AGC gain control. Upon narrowing both AGC and pseudo-sync pulses as indicated in FIG. 4(f), the low-pass filtering effect of the VCR transfers a waveform as illustrated in FIG. 4(g).

As previously indicated, any means which defeats or disables the copy-protect signals based upon the low-pass filtering effect of a typical VCR suffices to achieve the task set out by the invention. FIGS. 4(h) and 4(i)

illustrate waveforms exemplary of use of other means for increasing the effective frequency of pulses appearing in the vertical blanking interval. In this specific example, AGC and pseudo-sync pulses were narrowed, multiplied, and time-compressed so as to increase their frequency as shown in FIG. 4(h). Since the VCR circuitry cannot respond quickly, the net effect due to low-pass filtering is the waveform depicted in FIG. 4(i). Further, this technique can be combined with other techniques, e.g., attenuation of copy-protect signals during a detected portion in the vertical blanking interval, to render the same ineffective.

Many other variations of the method and apparatus can be appreciated based on the above teachings. In concept, those variations, modifications, and adaptations are derived from any method or apparatus which alters, substitutes or modifies the copy-protect signals in a fashion which takes into account the characteristics of VCR circuitry. Accordingly, it is intended that the subject matter of the invention be defined by the appended claims rather than the specific embodiments shown, illustrated or described.

What we claim is:

1. A method for disabling the effects of copy-protect signals added to blanking intervals of a video signal to inhibit a video recorder from making a copy of such video signal from which a satisfactorily viewable display can be made, comprising the steps of:
   detecting at least one of said copy-protect signals; and
   thereafter increasing the frequency content of said copy-protect signal beyond the effective bandwidth of the video recorder circuitry which reacts to added copy-protect signals.

2. A method as recited in claim 1 wherein said increasing step comprises increasing the effective frequency of a plurality of said copy-protect signals by narrowing the widths of pulses of said copy-protect signals.

3. A method as recited in claim 1 wherein said increasing step comprises increasing an effective frequency by effectively time-compressing a plurality of said copy-protect signals.

4. A method as recited in claim 1 wherein said increasing step comprises attenuating a plurality of said copy-protect signals beyond an effective range of signal sensitivity of said video cassette recorder.

5. A method as recited in any of claims 1, 2, 3 or 4 wherein at least one of said copy-protect signals is within a portion of said video signal defining a vertical blanking interval following a normal viewing field.

6. A method as recited in any of claims 1, 2, 3 or 4 wherein said video signal is a prerecorded video signal on a video cassette videotape.

7. A method for reducing the effect of a copy-protect signal embedded in a blanking interval of a video signal to inhibit a video recorder from making a copy of such video signal from which a satisfactorily viewable display can be made and said blanking interval includes at least one normal sync pulse, said method comprising the steps of:
   receiving an input video signal;
   detecting a normal sync signal and identifying the location of said copy-protect signals on the basis of said detecting of the normal sync signal; and
   increasing the frequency content of said copy-protect signal beyond an effective bandwidth of the circuitry of the video recorder which reacts to embedded copy-protect signals.

8. A method as recited in claim 7 wherein said normal sync pulse which is detected is a vertical sync pulse.

9. A method as recited in claim 8 wherein said blanking interval is a vertical blanking interval and there are a plurality of said copy-protect signals embedded therein, and wherein the frequency content of all of said copy-protect signals is increased beyond the effective bandwidth of video cassette recorder circuitry which reacts to embedded copy-protect signals.

10. An apparatus for inhibiting the effects of copy-protect signals contained in a video signal, comprising:
    means for receiving an input signal representative of said video signal;
    means connected with said means for receiving for detecting said copy-protect signals;
    means responsive to said means for detecting for increasing an effective frequency content of said copy-protect signals; and
    means for transmitting an output video signal which is said input video signal as modified by said means for increasing.

11. An apparatus as recited in claim 10 wherein said means for increasing includes means for attenuating a duration of said copy-protect signals.

12. An apparatus as recited in any of the previous claims 10 to 11 wherein said video signal is a prerecorded video signal obtained from a video cassette videotape.

13. An apparatus for inhibiting the effects of copy-protect signals contained in vertical blanking intervals of a video signal to inhibit a video recorder from making a copy of such video signal from which a satisfactorily viewable display can be made, said copy-protect signals including at least one added pseudo-sync signal and one added AGC pulse, said apparatus comprising:
    means for receiving an input signal representative of said video signal;
    means connected with said means for receiving for detecting vertical blanking intervals which include said copy-protect signals;
    means responsive to said means for detecting for generating disabling signals during the occurrence of at least a portion of said copy-protect signals which increase an effective frequency content of said copy-protect signals; and
    means for transmitting an output video signal which is said input video signal as modified by said disabling signals.

14. An apparatus as recited in claim 13 wherein said means for detecting comprises a sync separator responsive to the vertical blanking intervals of the video signal.

15. An apparatus as recited in claim 13 wherein said means for detecting comprises a sync separator responsive to the vertical blanking intervals of the video signal, said means for generating comprises means for attenuating the width of at least a portion of said copy-protect signals thereby to produce attenuated copy-protect signals, and said means for transmitting includes means for transmitting the attenuated copy-protect signals and a representation of the input video signal thereby to transmit an output video signal having disabled copy-protect signals.

16. A method for disabling the effects of copy-protect signals added to blanking intervals of a video signal to inhibit a video recorder from making a copy of such video signal from which a satisfactorily viewable display can be made, comprising the steps of:

detecting at least one of said copy-protect signals;

thereafter increasing the frequency content of said copy-protect signal beyond the effective bandwidth of the video recorder circuitry which reacts to added copy-protect signals; and providing the video signal having said increased frequency content to the video recorder.

17. A method for reducing the effect of a copy-protect signal embedded in a blanking interval of a video signal to inhibit a video recorder from making a copy of such video signal from which a satisfactorily viewable display can be made and said blanking interval includes at least one normal sync pulse, said method comprising the steps of:

receiving an input video signal;

detecting a normal sync signal and identifying the location of said copy-protect signals on the basis of said detecting;

increasing the frequency content of said copy-protect signal beyond an effective bandwidth of video recorder circuitry which reacts to embedded copy-protect signals; and providing the video signal having said increased frequency content to the video recorder.

18. A method of removing pulses added after sync pulses to blanking intervals of a video signal for inhibiting the making of a copy by a video recorder of such video signal which is satisfactorily viewable, comprising the steps of:

detecting one of the sync pulses and identifying the location of said added pulses on the basis of said detecting; and altering the added pulses by reducing their duration to a non-zero length which is beyond on effective bandwidth of the circuitry of the video recorder which reacts to such added pulses.

19. A method of altering a video signal to which pulses have been added for inhibiting the making of acceptable video recordings of the video signal by a video recorder, comprising the steps of:

sensing sync pulses present in the video signal; and increasing the frequency content of the added pulses occurring at a predetermined location relative to said sensed sync pulses, wherein the frequency content is increased beyond an effective bandwidth of the circuitry of the video recorder which reacts to such added signals.

* * * * *

UNITED STATES PATENT AND TRADEMARK OFFICE
CERTIFICATE OF CORRECTION

PATENT NO.   : 5,157,510
DATED        : October 20, 1992
INVENTOR(S)  : Ronald Quan and John F. Peruzzi It is certified that error appears in the above-identified patent and that said Letters Patent is hereby corrected as shown below:

Col. 1, line 22, after "RECORDINGS"" insert --now U.S. Patent 5,130,810 issued on July 14, 1992,--.

Col. 1, line 39, after "935,055," insert --now U.S. Patent 5,130,810 issued on July 14, 1992,--.

Signed and Sealed this

Fifteenth Day of March, 1994

Attest:

BRUCE LEHMAN

*Attesting Officer*     *Commissioner of Patents and Trademarks*